United States Patent [19]
Sohar et al.

[11] 3,894,026
[45] July 8, 1975

[54] PRODUCTION OF THEBAINE
[75] Inventors: Paul Sohar, Warren; Erwin F. Schoenewaldt, Watchung, both of N.J.
[73] Assignee: Merck & Co., Inc., Rahway, N.J.
[22] Filed: Oct. 16, 1973
[21] Appl. No.: 407,004

[52] U.S. Cl. .............................. 260/285; 424/260
[51] Int. Cl. ............................................ C07j 43/28
[58] Field of Search .................................. 260/285

[56] References Cited
UNITED STATES PATENTS
3,468,891  9/1967  Bartels-Keith ...................... 260/285

OTHER PUBLICATIONS
Goto et al., Proc. Japan Acad., Vol. 37, pp. 43–47, 1961.
Barton et al.; J. Chem. Soc.; 1965; pp. 2423–2438.

*Primary Examiner*—Donald G. Daus
*Assistant Examiner*—Mary C. Vaughn
*Attorney, Agent, or Firm*—Mario A. Monaco; Harry E. Westlake, Jr.

[57] ABSTRACT
Salutaridinol is reacted with an organic or inorganic acid halide, or an acid anhydride and the resulting reaction product is treated with a strong base to produce thebaine.

15 Claims, No Drawings

PRODUCTION OF THEBAINE

This invention relates to a process for converting salutaridinols to thebaine. More particularly, it is concerned with an improved method for preparing thebaine by reacting a salutaridinol with an organic or inorganic acid halide or an acid anhydride and treating the resulting reaction product with a strong base.

The only known method for converging salutaridinols to thebaine is by reaction with aqueous mineral acids [Barton et al., J. Chem. Soc., 2423 (1965)]. However, the yield of thebaine by this method is low, and it is therefore not suitable for use on a large scale. Thus, the yield of thebaine obtained by this method is 31% from salutaridinol-II and 37% from salutaridinol-I.

Accordingly, it is an object of this invention to provide an improved process for converting salutaridinols to thebaine. Another object is to provide an intermediate product which on treatment with a strong base is converted to thebaine. Other objects will be apparent from the detailed description of the invention hereinafter provided.

In accordance with this invention it is found that thebaine is produced in high yields by reacting either of the epimeric salutaridinols or mixtures thereof with an organic or inorganic acid halide or an acid anhydride, and then reacting the resulting reaction product with a strong base. This process can be depicted structurally as follows:

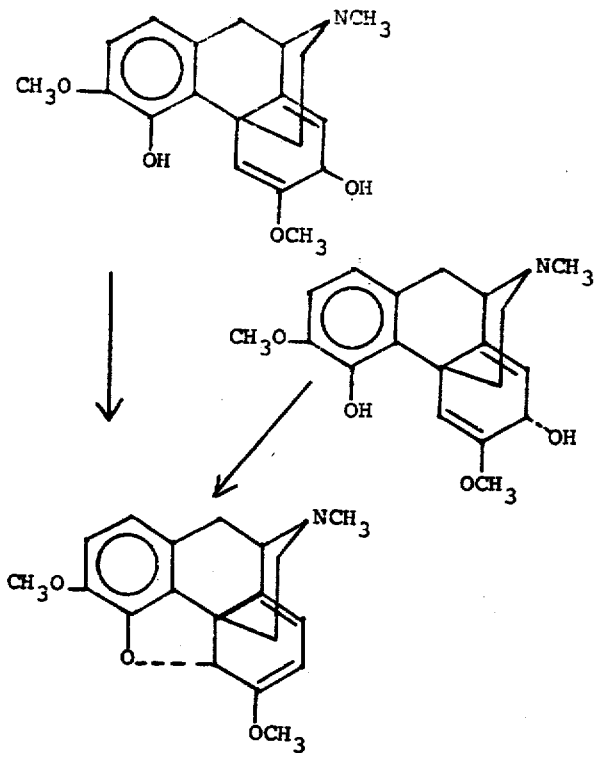

The first step of the process is effected by intimately contacting either of the epimeric salutaridinols or a mixture thereof with an inorganic or organic acid halide or an organic acid anhydride. The reaction is carried out by mixing the reactants at a temperature of −10° to 25°C., preferably in the presence of a suitable solvent, for sufficient time to complete the formation of the intermediate product. Generally, it is preferred to effect the reaction in the presence of a base, preferably a tertiary amine, which acts as a solvent for the reaction and also serves as an acid scavenger for the acid produced in the reaction. In the absence of a suitable base, the salutaridine acts as the acid scavenger for the reaction. The exact mechanism of the reaction and the precise nature of the intermediate product are not known, but we postulate that the intermediate is an ester of the 7-hydroxyl of the formula

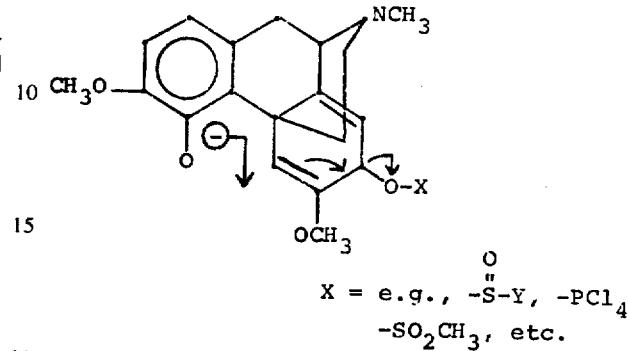

$$X = \text{e.g.}, -\overset{\text{O}}{\underset{\|}{\text{S}}}-Y, -PCl_4, -SO_2CH_3, \text{etc.}$$

This ester is then decomposed by treatment with a strong base with participation of the phenolate anion to produce the desired thebaine. it should, of course, be understood that these theoretical explanations of the nature of the intermediate product and the course of the reaction are based on our present knowledge and does not exclude the possibility that subsequent experimental data will establish that these explanations are, in fact, incorrect. Accordingly, we do not wish to be bound by these theoretical explanations however likely they now appear to be in the light of our present knowledge. These explanations are presented primarily as a means for providing a better understanding of our invention.

The reactants suitable for carrying out the process of our invention include organic acid anhydrides such as lower aliphatic ($C_{2-4}$) acid anhydrides such as acetic anhydride, and various acid halides having a reactive halogen and a leaving moiety group forming a derivative of the salutaridine which on cleavage with a strong base forms the desired thebaine. Various inorganic and organic acid chlorides and bromides are particularly useful for this purpose and constitute preferred reactants. Examples of such halides that might be mentioned are thionyl chloride, thionyl bromide, phosphorous oxychloride, phosphorous oxybromide, phosphorous trichloride, phosphorous tribromide, phosphorous pentachloride, phosphorous pentabromide, phosgene, methane sulfonyl chloride, methane sulfonyl chloride and sulfur dioxide, methane sulfonyl bromide, methylchlorocarbonate, benzylchlorocarbonate, p-dinitrophenylchlorocarbonate, and the like. In particular, we prefer to use the acid chlorides since these products are less expensive and more readily available.

In carrying out the reaction, it is preferred to use at least one equivalent of the reagent in order to obtain maximum yields of the desired thebaine. Preferably, the reaction is effected in the presence of a base such as a tertiary amine, for example pyridine, collidine, triethylamine, and the like which also act as acid scavengers. Alternatively, the reaction can be carried out in a suitable solvent for the reaction mixture, either with or without the added base.

The cleavage of the intermediate product is effected by reaction with a strong base at a pH in excess of about 10. Strong bases suitable for this purpose that might be mentioned are alkali metal hydroxides, carbonates and phosphates such as sodium or potassium hydroxides and carbonates, trisodium phosphate, and the like. Generally, this cleavage is accomplished at temperatures from about 25° to about 100°C.; the exact temperatures and conditions for the cleavage being dependent upon the nature of the reagent reacted with a salutaridinol.

As indicated above, the salutaridinol reacted can be either of the epimeric salutaridinols or a mixture thereof. The process of this invention is particularly useful in converting the epimeric mixtures of salutaridinols obtained by the sodium borohydride reduction of salutaridine.

The following examples illustrate the methods of carrying out the present invention.

EXAMPLE 1

A crude mixture of salutaridinol-I and salutaridinol-II was prepared from 3.27 g. (0.01 mole) of salutaridine by treatment with 1.9 g. (0.05 mole) of sodium borohydride in ethanol and subsequent extraction from the quenched reaction mixture. The dried residue was dissolved in 60 ml. of dry pyridine in a nitrogen atmosphere in a 100 ml. round bottom flask equipped with a thermometer, magnetic stirring, rubber septum, nitrogen outlet, and a cooling bath. The solution was cooled to −15°C. and 0.78 ml. (1.28 g., 0.0107 mole) of thionyl chloride was added through the septum from a syringe dropwise with vigorous stirring over a period of 10 minutes. The temperature was maintained below −10°C. during the addition and then below 0°C. for the next 2 hours. The initially colorless solution turned dark green after the addition, but then slowly became light yellow.

The cold reaction mixture was poured into 180 ml. of 0.25 N sodium hydroxide solution with cooling and stirring. The resulting light brown solution was heated in an oil bath to boil for one hour during which 180 ml. of distillate was collected with the simultaneous replacement of 70 ml. of water from a dropping funnel. At the end the reaction mixture was free of pyridine and contained a white crystalline solid. After cooling in ice bath, the reaction mixture was filtered and the crystals were washed with cold water and air dried to constant weight. The yield of thebaine was 2.49 g. (80%); m.p. 194°–195°C; I.R. (in $CH_2Cl_2$) superimposable with authentic spectrum; single spot coincident with authentic material on TLC (10% $MeOH/CHCl_3$ on silica gel and $CHCl_3$ on alumina) and single peak in liquid chromatography (2 IPAX column coated with 2-cyanoethyl ether and eluted with 10% ethanol/hexane 25% saturated with 2-cyanoethyl ether).

EXAMPLE 2

To a cooled solution of 99 mg. (0.3 mmole) of salutaridinol-I in 3 ml. of dry pyridine was added 27 µl. (0.36 mmole) of thionyl chloride from a syringe in nitrogen atmosphere. The resulting yellow solution was kept in the refrigerator overnight and then quenched into a solution of 100 mg. (0.72 mmole) of potassium carbonate in 20 ml. of water. The resulting solution was concentrated in vacuo (water bath below 40°C.) in order to remove pyridine, and the residual liquid was diluted with water and made alkaline (pH 11.7) with sodium hydroxide. A TLC assay at this point showed a trace amount of thebaine and a slow moving heavy spot near the origin. After heating on steam bath for one-half hour, the crude thebaine separated as light colored crystals; yield 81.7%. The TLC assay of the reaction mixture was a single spot for thebaine and did not show the earlier slow moving spot.

EXAMPLE 3

Salutaridinol-II was subjected to the conditions of Example 2. The reaction mixture was quenched into a dilute sodium hydroxide solution as in Example 1 and the pyridine was boiled off atmospherically while the crude product separated from the solution in comparable yield.

EXAMPLE 4

A solution of 99 mg. (0.3 mmoles) of salutaridinol-I in 3 ml. of dry pyridine was cooled to −15°C. in a nitrogen atmosphere and 3.8 ml. of a solution containing phosphorous pentachloride in methylene chloride (20 mg./ml.) was added dropwise. The resulting clear yellow solution was stirred for 2 hours and quenched into 70 ml. of 0.1 N sodium hydroxide solution. On heating at boiling temperature for 0.5 hours, the pyridine distilled off and the crude thebaine separated as the water was continually replaced from a dropping funnel. A chloroform extract of the total reaction mixture was assayed for thebaine by liquid chromatography which indicated a 50.3% yield.

EXAMPLE 5

Phosphorus oxychloride (33 µl.) and phosphorus trichloride (32 µl.) were used on the same scale and in a manner similar to Example 4 except that they were introduced in undiluted form into the reaction mixture from a syringe. Thebaine was detected in both reaction mixtures in comparable yields.

EXAMPLE 6

Acetic anhydride (160 µl.) was added to a solution of 60 mg. of salutaridinol-I in 1 ml. of pyridine at 25°C. After one day at room temperature, the reaction mixture was worked up as in Example 4 and the isolated crude thebaine assayed by liquid chromotography.

EXAMPLE 7

A solution of 99 mg. of salutaridinol-II (0.3 mmole) in 3 ml. of dry methylene chloride was cooled in an ice bath and 78 µl. (0.6 mmole) of collidine was added from a syringe followed by 30 µl. (0.3 mmole) of methanesulfonyl chloride which contained 4% sulfur dioxide. The reaction mixture was stirred at 25°C. for 3 hours and the methylene chloride solution was agitated with 20 ml. of 1 N sodium hydroxide. The organic layer was dried and chromatographed on alumina to afford pure thebaine.

EXAMPLE 8

A solution of 33 mg. (0.1 mmole) of salutaridinol-I in 3 ml. of dimethylformamide was treated with 20 µl. (0.2 mmole) of triethylamine and 10 µl. (0.1 mmole) of methanesulfonyl chloride with cooling and stirring. After a 1 hour reflux period ($N_2$ atmosphere) the reaction mixture was worked up as in Example 7 with similar results.

EXAMPLES 9-20

Following the procedures described in the foregoing examples, salutaridinols were reacted with other acid chlorides in the presence of various solvents to obtain thebaine. These are shown in the following table:

| Example No. | Starting Material | Reagent | Solvent |
|---|---|---|---|
| | Saluta-ridinol | | |
| 9 | II | $SOCl_2$ | Tetrahydrofuran* |
| 10 | I | $POCl_3$ | Pyridine |
| | I | $PCl_3$ | Pyridine |
| | I | $PCl_5$ | Pyridine |
| 11 | I | ClCOCl | Pyridine |
| | I | $CH_3SO_2Cl$ | Acetonitrile/collidine |
| | I | $CH_3SO_2Cl$ | Dimethylformamide |
| 12 | I | $CH_3SO_2Cl$ | Dimethylformamide/triethylamine |
| | I | $CH_3SO_2Cl + SO_2$ | Methylene chloride/collidine |
| 13 | I | $CH_3SO_2Cl + SO_2$ | Ethylether/collidine |
| 14 | I | $CH_3SO_2Cl + SO_2$ | Dimethylformamide/collidine |
| 15 | I | $CH_3SO_2Cl + SO_2$ | Tetrahydrofuran/collidine |
| 16 | I | $CH_3SO_2Cl + SO_2$ | Acetonitrile/collidine |
| 17 | II | $CH_3SO_2Cl + SO_2$ | Methylene chloride/collidine |
| 18 | I | $ClCOOCH_3$ | Acetonitrile/collidine |
| 19 | I | $ClCOOCH_2\phi$ | Acetonitrile/collidine |
| 20 | I | $ClCOOC_6H_4NO_{2-p}$ | Acetonitrile/ethyldiisopropylamine |
| | I | $Ac_2O$ | Pyridine |

*The basic N of the salutaridinol is the base.

** Conceived of as the complex acid chloride 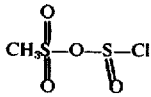

The processes of the above examples can be carried out in the same way with the various acid bromides mentioned above to produce thebaine.

We claim:

1. The process which comprises the steps of:
reacting salutaridinol with a lower aliphatic $C_{2-4}$) acid anhydride or with thionyl chloride, thionyl bromide, phosphorous oxychloride, phosphorous oxybromide, phosphorous trichloride, phosphorous tribromide, phosphorous pentachloride, phosphorous pentabromide, phosgene, methane sulfonyl chloride, and sulfur dioxide, methane sulfonyl bromide, methylchlorocarbonate, benzylchlorocarbonate or p-dinitrophenylchlorocarbonate in the presense or absense of an additional tertiary amine; and treating the resulting reaction product with an alkali metal hydroxide, carbonate or phosphate.

2. The process of claim 1 wherein the reaction with salutaridinol is carried out at a temperature between $-10°$ and $25°C$.

3. The process of claim 1 wherein the reaction of the salutaridinol is carried out in the presence of an additional tertiary amine.

4. The process of claim 1 wherein thionyl chloride is used.

5. The process of claim 1 wherein phosphorous oxychloride is used.

6. The process of claim 1 wherein phosphorous pentachloride is used.

7. The process of claim 1 wherein a sulfonyl chloride is used.

8. The process of claim 1 wherein methane sulfonyl chloride is used.

9. The process of claim 1 wherein methane sulfonyl chloride or sulfur dioxide is used.

10. The process of claim 1 wherein the acid anhydride is acetic anhydride.

11. The process of claim 1 wherein the salutaridinol is reacted with thionyl chloride in the presence of pyridine.

12. The process of claim 1 wherein the salutaridinol is salutaridinol-I.

13. The process of claim 1 wherein the salutaridinol is salutaridinol-II.

14. The process of claim 1 wherein a mixture of epimeric salutaridinols is used.

15. The process of claim 1 wherein the salutaridinol is reacted with thionyl chloride and the resulting reaction product is treated with sodium hydroxide at a pH in excess of about 10.

* * * * *

UNITED STATES PATENT OFFICE
CERTIFICATE OF CORRECTION

PATENT NO. : 3,894,026
DATED : July 8, 1975
INVENTOR(S) : Paul Sohar and Erwin F. Schoenewaldt It is certified that error appears in the above-identified patent and that said Letters Patent are hereby corrected as shown below:

In column 1, line 8, "converging" should be "converting".

In column 5, after "+$SO_2$" appearing in Examples 12, 13, 14, 15, 16 and 17, insert XX.

Signed and Sealed this seventeenth Day of February 1976

[SEAL]

Attest:

RUTH C. MASON
Attesting Officer

C. MARSHALL DANN
Commissioner of Patents and Trademarks